(12) United States Patent
Koyama (10) Patent No.: US 12,009,498 B2
(45) Date of Patent: Jun. 11, 2024

(54) BATTERY PACK

(71) Applicant: HONDA MOTOR CO., LTD., Tokyo (JP)

(72) Inventor: Rieko Koyama, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 780 days.

(21) Appl. No.: 17/058,954

(22) PCT Filed: May 9, 2019

(86) PCT No.: PCT/JP2019/018575
§ 371 (c)(1),
(2) Date: Nov. 25, 2020

(87) PCT Pub. No.: WO2019/230325
PCT Pub. Date: Dec. 5, 2019

(65) Prior Publication Data
US 2021/0218089 A1 Jul. 15, 2021

(30) Foreign Application Priority Data
May 31, 2018 (JP) ................................ 2018-105426

(51) Int. Cl.
*H01M 10/6568* (2014.01)
*H01M 10/613* (2014.01)
(Continued)

(52) U.S. Cl.
CPC ..... *H01M 10/6568* (2015.04); *H01M 10/613* (2015.04); *H01M 10/625* (2015.04);
(Continued)

(58) Field of Classification Search
CPC .......... H01M 10/6568; H01M 10/613; H01M 10/625; H01M 10/6551; H01M 10/6556;
(Continued)

(56) References Cited

U.S. PATENT DOCUMENTS

2012/0156543 A1* 6/2012 Cicero .............. H01M 10/0481
429/120
2012/0325447 A1 12/2012 You et al.
(Continued)

FOREIGN PATENT DOCUMENTS

CN 102280671 A 12/2011
CN 104466296 A 3/2015
(Continued)

OTHER PUBLICATIONS

English translation of KR20140077272A (Year: 2014).*
(Continued)

*Primary Examiner* — Ula C Ruddock
*Assistant Examiner* — Sarika Gupta
(74) *Attorney, Agent, or Firm* — Paratus Law Group, PLLC (57) ABSTRACT

A battery pack is provided with: a battery module having a cell stack configured by stacking a plurality of cells; and a cooling mechanism for cooling the battery module. The cooling mechanism is a refrigerant flow passage through which a liquid medium passes. The cell stack and the refrigerant flow passage are arranged with a bottom plate interposed therebetween. A plurality of protrusions are provided on the lower surface of the bottom plate. The plurality of protrusions are arranged in a staggered pattern along the stacking direction of the cells.

6 Claims, 7 Drawing Sheets

(51) Int. Cl.
  *H01M 10/625* (2014.01)
  *H01M 10/6551* (2014.01)
  *H01M 10/6556* (2014.01)
  *H01M 50/204* (2021.01)
  *H01M 50/209* (2021.01)
  *H01M 50/271* (2021.01)
  *H01M 50/293* (2021.01)

(52) U.S. Cl.
  CPC ... *H01M 10/6551* (2015.04); *H01M 10/6556* (2015.04); *H01M 50/204* (2021.01); *H01M 50/209* (2021.01); *H01M 50/271* (2021.01); *H01M 50/293* (2021.01); *H01M 2220/20* (2013.01)

(58) Field of Classification Search
  CPC ............ H01M 50/204; H01M 50/209; H01M 50/271; H01M 50/293; H01M 2220/20; H01M 10/6567; H01M 10/647; H01M 50/224; H01M 50/249; Y02E 60/10
  See application file for complete search history.

(56) References Cited

U.S. PATENT DOCUMENTS

2013/0146249 A1* 6/2013 Katayama ............ H01M 10/613
  165/46
2013/0149582 A1  6/2013 Kimura et al.
2015/0082821 A1  3/2015 Ganz et al.

FOREIGN PATENT DOCUMENTS

| DE | 102010029869 A1 | | 12/2011 |
|---|---|---|---|
| DE | 102012012663 A1 | | 12/2013 |
| JP | 2013-122818 A | | 6/2013 |
| JP | 2014-157756 A | | 8/2014 |
| JP | 2014-215250 A | | 11/2014 |
| JP | 2016-085886 A | | 5/2016 |
| KR | 20140077272 A | * | 6/2014 |

OTHER PUBLICATIONS

Jul. 23, 2019, International Search Report issued for related PCT application No. PCT/JP2019/018575.

Jul. 23, 2019, International Search Opinion issued for related PCT application No. PCT/JP2019/018575.

Nov. 10, 2022, German Office Action issued for related DE Application No. 112019002698.4.

Sep. 13, 2023, translation of Chinese Office Action issued for related CN Application No. 201980034212.2.

* cited by examiner

BATTERY PACK

CROSS REFERENCE TO PRIOR APPLICATION

This application is a National Stage Patent Application of PCT International Patent Application No. PCT/JP2019/018575 (filed on May 9, 2019) under 35 U.S.C. § 371, which claims priority to Japanese Patent Application No. 2018-105426 (filed on May 31, 2018), which are all hereby incorporated by reference in their entirety.

TECHNICAL FIELD

The present disclosure relates to a battery pack mounted on an electric vehicle or the like.

BACKGROUND ART

Battery packs have been conventionally mounted on electric vehicles and the like. The battery pack includes a cell stack configured by stacking a plurality of cells. The cells need to be cooled because they are likely to degrade in a high temperature state. For example, as described in Patent Document 1, a battery module is installed on a cooling plate to which a refrigerant is supplied.

RELATED ART REFERENCE

Patent Document

[Patent Document]: JP-A-2013-122818

SUMMARY OF THE INVENTION

Problems to be Solved by the Invention

However, in Patent Document 1 since an air cooling type cooling plate is used, a very high cooling efficiency cannot be expected. Although the liquid cooling type is superior in terms of the cooling efficiency, even the liquid cooling type is required to further increase the cooling efficiency for the battery module.

An object of the present disclosure is to provide a battery pack capable of improving the cooling performance of the battery module.

Means for Solving the Problems

The present disclosure relates to a battery pack including
a battery module including a cell stack configured by stacking a plurality of cells and a cooling mechanism for cooling the battery module, in which
the cooling mechanism is a refrigerant flow path through which a liquid medium passes,
the cell stack and the refrigerant flow path are arranged with a partition wall being interposed therebetween,
a refrigerant flow path forming surface of the partition wall is provided with a plurality of convex portions, and
the plurality of convex portions are arranged in a staggered manner along a stacking direction of the cells.

Advantageous Effects of the Invention

According to the present disclosure, since a plurality of convex portions are arranged in a staggered manner along the stacking direction of the cells in the refrigerant flow path, the flow of the liquid refrigerant is obstructed by the convex portions to form a turbulent flow, and the efficiency of heat exchange between the liquid medium and the battery module, which occurs through the partition wall, is increased, thereby improving the cooling performance of the battery module.

MODES FOR CARRYING OUT THE INVENTION

Hereinafter, embodiments of a battery pack according to the present disclosure will be described with reference to the accompanying drawings. It is assumed that the drawings are viewed in the direction as indicated by the reference symbols.

First Embodiment

Battery Pack

Figure 1:
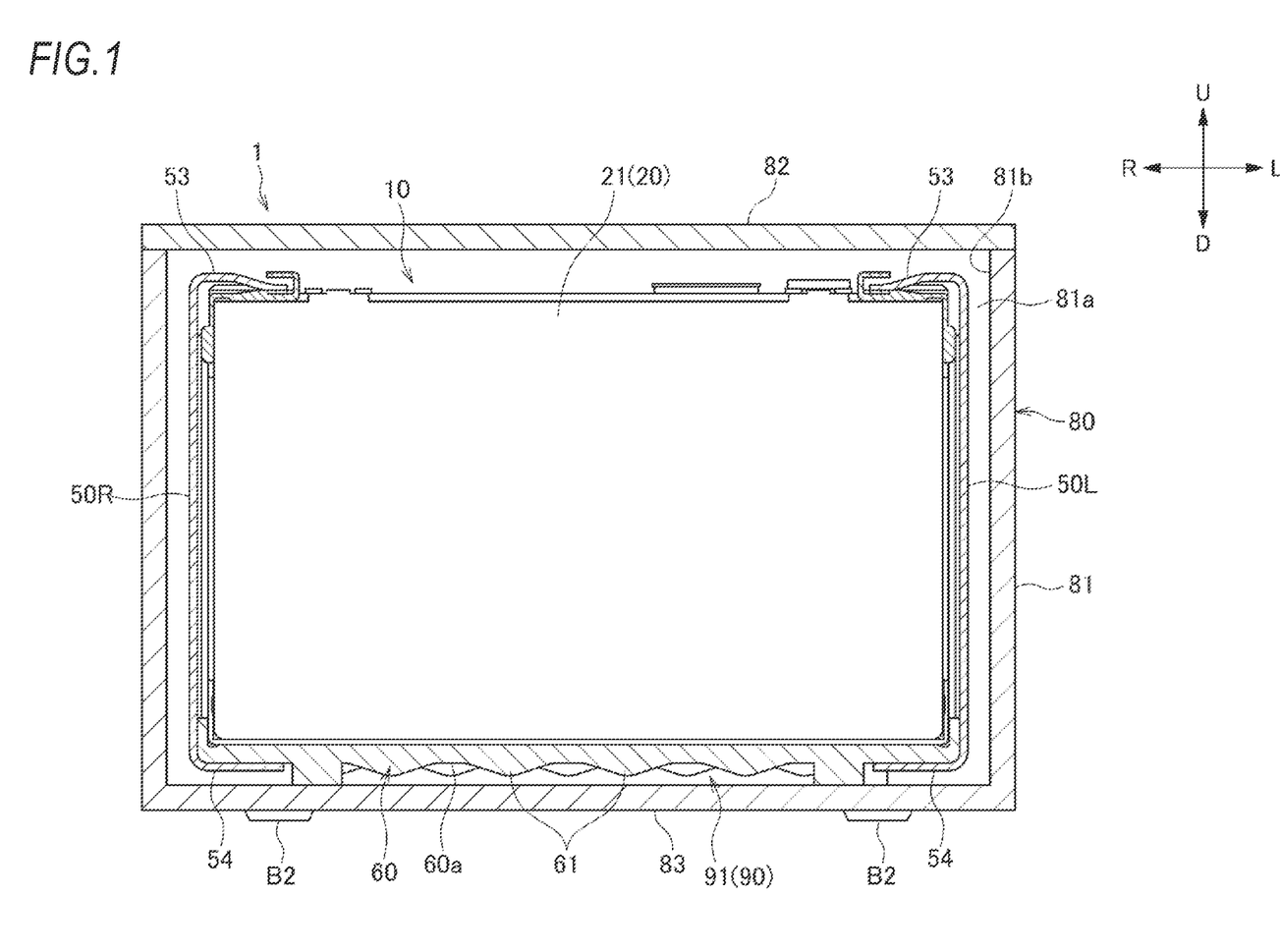
FIG. 1 is a cross-sectional view showing a battery pack according to a first embodiment.

As shown in FIG. 1, the battery pack 1 according to the first embodiment of the present disclosure includes a battery module 10, a battery case 80 for housing the battery module 10, and a cooling mechanism 90 for cooling the battery module 10.

Battery Case

The battery case 80 includes a case main body 81 including a module housing portion 81a formed therein, and a case cover 82 that seals an opening 81b of the case main body 81. The cooling mechanism 90 is provided between the battery module 10 and a base plate 83 of the battery case 80. While the present embodiment illustrates one battery module 10 arranged inside the battery case 80, the number of battery modules 10 may be two or more.

Battery Module

Figure 2:
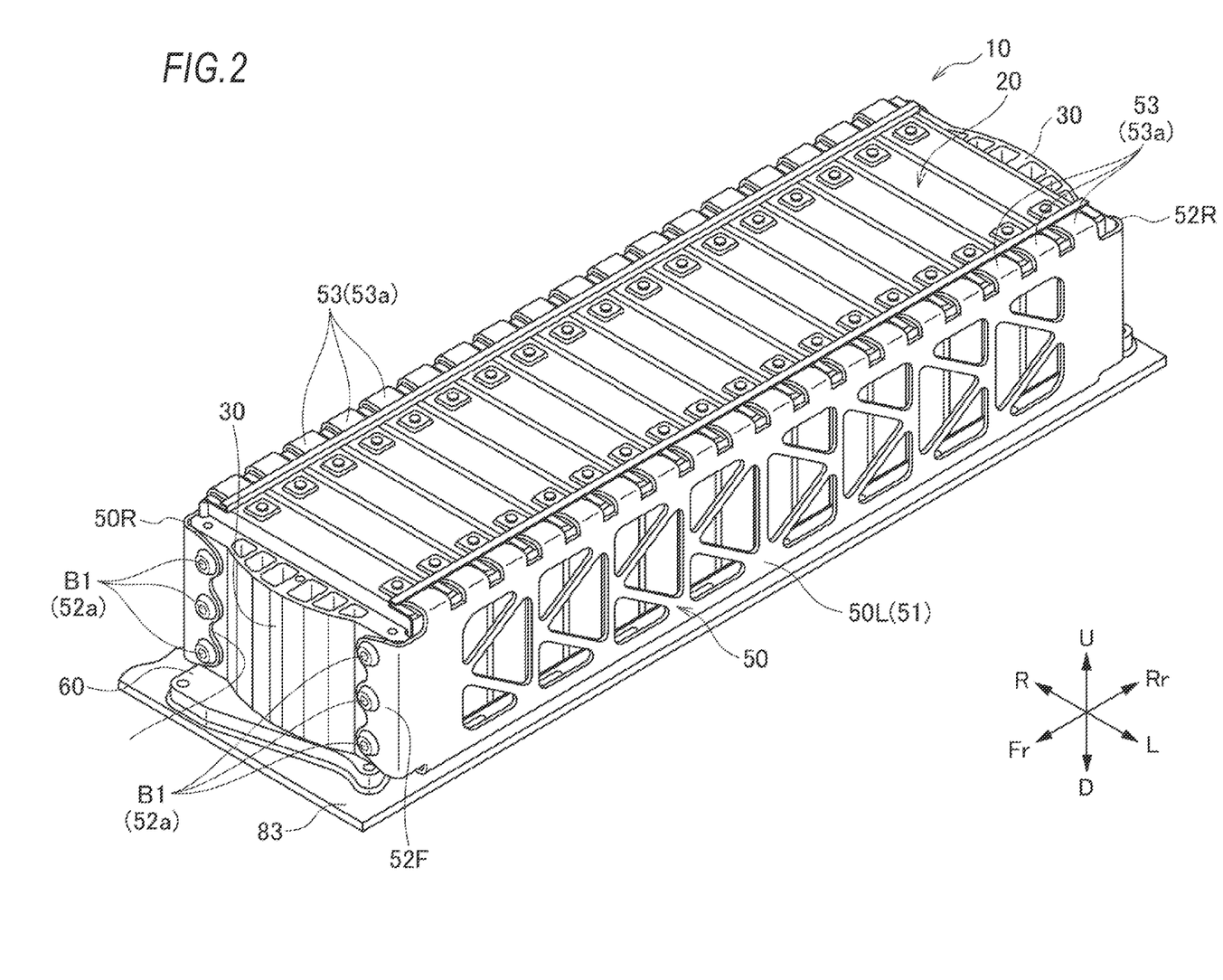
FIG. 2 is a perspective view showing a battery module of the battery pack shown in FIG. 1 when viewed obliquely from above.
Figure 3:
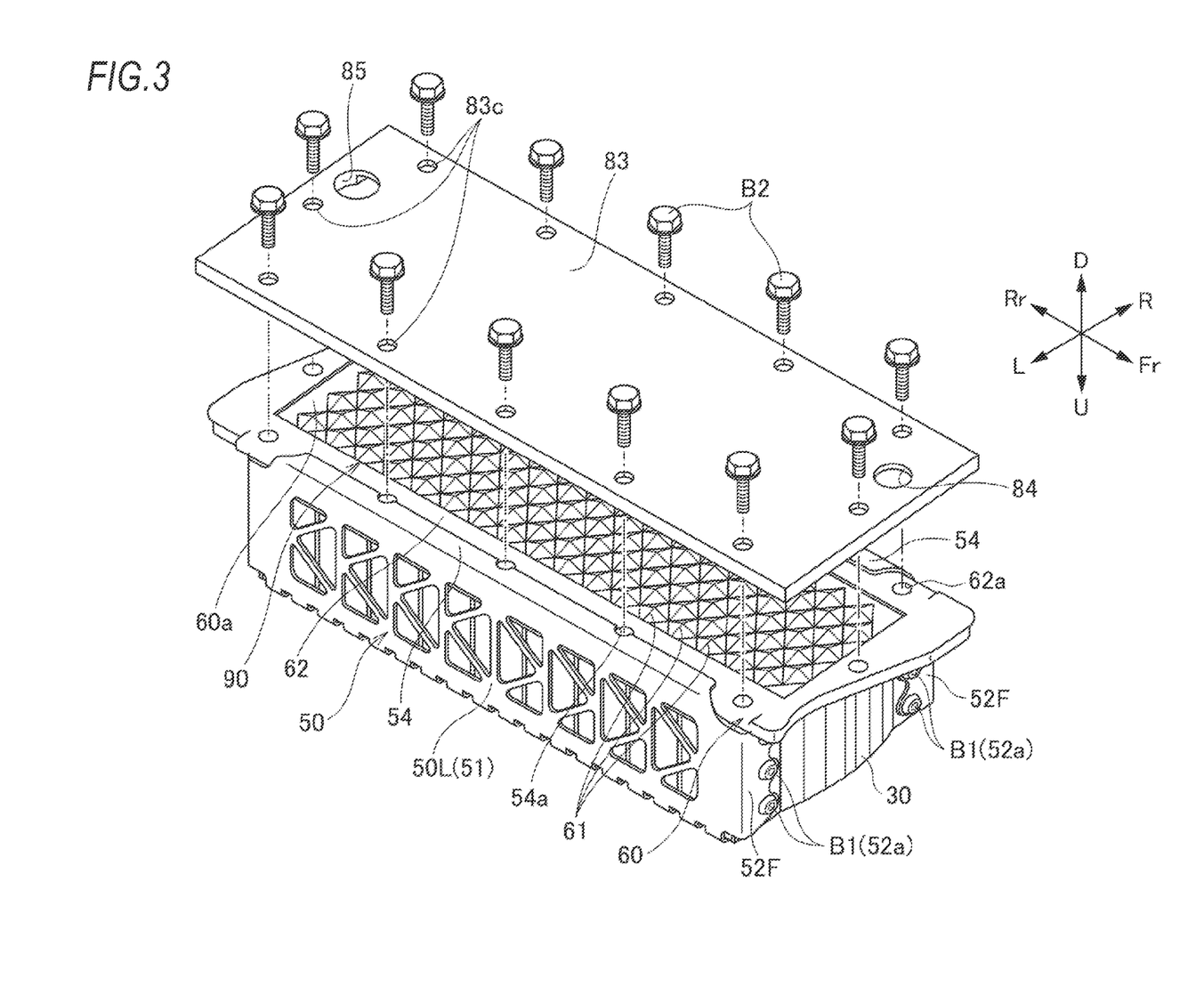
FIG. 3 is an exploded perspective view showing the battery module of the battery pack shown in FIG. 1 when viewed obliquely from below.

As shown in FIGS. 2 and 3, the battery module 10 is configured by stacking a plurality of cells 21 in a front-and-rear direction, and includes a cell stack 20 including a front surface, a rear surface, a left surface, a right surface, an upper surface, and a lower surface, a pair of end plates 30 arranged on the front surface and the rear surface of the cell stack 20, a side plate 50 connecting the pair of end plates 30, and a bottom plate 60 serving as a partition wall arranged on the lower surface of the cell stack 20. The side plate 50 includes a right side plate 50R arranged on the right surface of the cell stack 20, and a left side plate 50L arranged on the left surface of the cell stack 20.

In the description and so on, for simplicity and clarity of the explanation, the stacking direction of the cells 21 is defined as the front-and-rear direction, and the directions orthogonal to the stacking direction of the cells 21 are defined as a left-and-right direction and an up-and-down direction, but they are irrelevant to the front-and-rear direction, and so on of the product on which the battery module 10 is mounted. That is, when the battery module 10 is mounted on the vehicle, the stacking directions of the cells 21 may coincide with the front-and-rear direction of the vehicle, or may be the up-and-down direction or the left-and-right direction of the vehicle, or may be a direction inclined from these directions. In the drawings, with respect to the battery module 10, Fr denotes the front side, Rr denotes the rear side, L denotes the left side, R denotes the right side, U denotes the upper side, and D denotes the lower side.

Cell Stack

The cell stack 20 is configured by alternately stacking a plurality of cells 21 and insulating members (not shown) in the front-and-rear direction. The pair of end plates 30 are arranged on the front surface and the rear surface of the cell stack 20, respectively, and the bottom plate 60 is arranged on the lower surface of the cell stack 20. The right side plate 50R and the left side plate 50L are arranged on the left surface and the right surface of the cell stack 20 in an insulated state via a slight gap, respectively.

It is known that the cell 21 expands due to temperature change and aging deterioration. The cell 21 has a rectangular parallelepiped shape in which a length in the up-and-down direction is greater than a length in the front-and-rear direction and a length in the left-and-right direction is greater than the length in the up-and-down direction. Accordingly, the cell 21 is configured such that areas of the front surface and the rear surface are much greater than areas of the left surface, the right surface, the upper surface and the lower surface, and the front surface and the rear surface of the cell 21 are likely to expand at a central portion in the left-and-right direction and at a central portion in the up-and-down direction.

End Plate

The pair of end plates 30 are in contact with the front surface and the rear surface of the cell stack 20, respectively, and receive the load of the cell stack 20 in the cell stacking direction. Since the load of the cell stack 20 in the cell stacking direction is mainly due to the expansion of the cell 21 resulting from the temperature change and aging deterioration, and as described above, since the front surface and the rear surface of the cell 21 are likely to expand at the central portion in the left-and-right direction and at the central portion in the up-and-down direction, the end plate 30 receives a large load from the central portion in the left-and-right direction and the central portion in the up-and-down direction.

The end plate 30 is formed by using an aluminum extruding material. Since the end plate 30 receives a large load from the cell stack 20 in the cell stacking direction, an inner surface in contact with the cell stack 20 is flat, while an outer surface not in contact with the cell stack 20 has an outwardly-bulged shape. A plurality of (three, in the example) screw holes (not shown) for attaching bolts B1 for fastening the left side plate 50L and the right side plate 50R are provided in the vicinity of the left and right ends of each end plate 30.

Side Plate

The left side plate 50L and the right side plate 50R are formed by pressing a metal plate material, and include a side plate main body 51 along the left surface or right surface of the cell stack 20, a front flange portion 52F extending from the front end of the side plate main body 51 along the front surface of the front end plate 30 in a mutually approaching direction, a rear flange portion 52R extending from the rear end of the side plate main body 51 along the rear surface of the rear end plate 30 in a mutually approaching direction, an upper flange portion 53 extending from the upper end of the side plate main body 51 along the upper surface of the cell stack 20 in a mutually approaching direction, and a lower flange portion 54 extending from the lower end of the side plate main body 51 along the lower surface 60a of the bottom plate 60 in a mutually approaching direction.

The front flange portion 52F and the rear flange portion 52R are provided with a plurality of fastening portions 52a that are fastened to the front end plate 30 or the rear end plate 30 with bolts B1. The fastening portions 52a have a round hole through which the bolt B1 is inserted, and the front flange portion 52F and the rear flange portion 52R are fastened to the front end plate 30 or the rear end plate 30 by screwing the bolt B1 inserted through the round hole into a screw hole of the front end plate 30 or the rear end plate 30. As a result, the cell stack 20 and the pair of end plates 30 are held in place in the cell stacking direction by the front flange portion 52F and the rear flange portion 52R of the left side plate 50l, and the right side plate 50R.

The upper flange portion 53 and the lower flange portion 54 clamp the cell stack 20 and the bottom plate 60 in the up-and-down direction at the left end and the right end of the cell stack 20. The upper flange portion 53 includes a plurality of elastic pieces 53a arranged in the front-and-rear direction, and the number and positions of the elastic pieces 53a correspond to the number and positions of the cells 21 stacked in the front-and-rear direction.

The lower flange portion 54 is provided with a plurality of fastening portions 54a that are fastened to the bottom plate 60 with bolts B2. As a result, the left side plate 50L the right side plate 50R and the bottom plate 60, which form the side plate 50, are integrally connected.

Bottom Plate

The bottom plate 60 is manufactured by aluminum die casting and has a rectangular shape in a plan view, which extends along the lower surface of the cell stack 20 and the end plate 30. A plurality of screw holes 62a to which the bolts B2 are attached are provided on a peripheral edge portion 62 of the bottom plate 60. The base plate 83 of the case main body 81, to which the bottom plate 60 is fixed, is provided with the same number of through holes 83c as the screw holes of the bottom plate 60 at positions overlapping the screw holes 62a of the bottom plate 60.

Cooling Mechanism

As shown in FIGS. 1 and 3, the cooling mechanism 90 is a refrigerant flow path 91 through which a liquid medium W passes, and the refrigerant flow path 91 is formed by the lower surface 60a of the bottom plate 60 and the upper surface 83b of the base plate 83 forming the battery case 80. That is, the bottom plate 60 forms a part of the refrigerant flow path 91 as the cooling mechanism 90. The refrigerant flow path 91 is configured in such a manner that a concave portion formed over most of the lower surface 60a of the bottom plate 60 except for the peripheral edge portion 62 is sealed with the base plate 83 of the battery case 80. Between the base plate 83 and the bottom plate 60, there is provided a sealing member (not shown) formed over the entire circumference to surround the refrigerant flow path 91 so as to seal therebetween.

A refrigerant inlet portion 84, which is an inlet for the liquid medium W to the refrigerant flow path 91, is provided at one end (front portion) of the base plate 83 of the battery case 80 in the front-and-rear direction (stacking direction of the cells 21). A refrigerant outlet portion 85, which is an outlet for the liquid medium W from the refrigerant flow path 91, is provided at the other end (rear portion) of the base plate 83 in the front-and-rear direction. Therefore, the refrigerant flows from the refrigerant inlet portion 84 toward the refrigerant outlet portion 85 in the front-and-rear direction (stacking direction of the cells 21).

Figure 4:
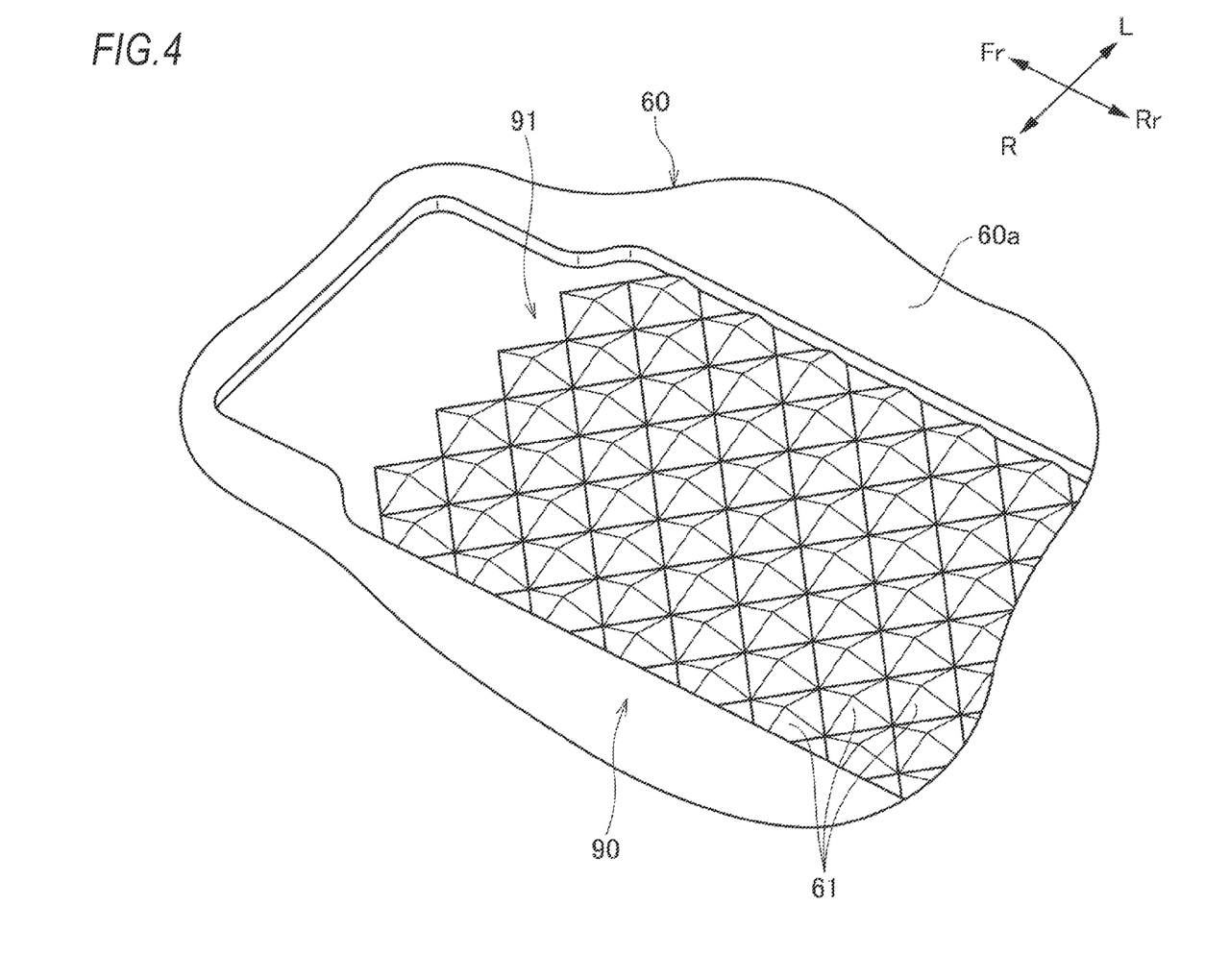
FIG. 4 is an enlarged view showing a refrigerant flow path forming surface shown in FIG. 3.

As shown in FIG. 4, the lower surface 60a of the bottom plate 60, that is, the refrigerant flow path forming surface is provided with a plurality of convex portions 61 protruding into the refrigerant flow path 91. The plurality of convex portions 61 are arranged in a staggered manner along the stacking direction (front-and-rear direction) of the cells 21 and the direction orthogonal to the stacking direction (left-and-right direction). Each convex portion 61 is a quadrangular pyramid having a square bottom surface, and is arranged such that a diagonal line 61a, which is one of two diagonal lines 61a and 61b, is in the stacking direction of the cells 21.

In the battery pack 1 configured as described above, after the side plate 50, the bottom plate 60, and the base plate 83 of the battery case 80 are aligned with each other, the bolts B2 are inserted into the through holes 83c of the base plate 83 from below, and the bolts B2 are tightened into the screw holes 62a of the bottom plate 60, so that the side plate 50, the bottom plate 60 and the bottom plate 83 are integrally fastened together with the bolt B2. Then, the bottom plate 60 and the base plate 83 joined to each other form the refrigerant flow path 91 through which the liquid medium W flows. In the present embodiment, the bottom plate 60 serves as a partition wall separating the cell stack 20 and the refrigerant flow path 91, and the battery module 10 is cooled by the liquid medium W via the bottom plate 60.

In the battery pack 1, since the bottom plate 60, which is a component f the battery module 10, forms a part of the refrigerant flow path 91, the battery module 10 may be efficiently cooled by the liquid medium W while preventing an increase in the number of parts. Since a plurality of convex portions 61 are provided on the lower surface 60a of the bottom plate 60, the contact area between the liquid medium W and the bottom plate 60 is increased, thereby further improving the cooling performance.

Since the plurality of convex portions 61 are arranged in a staggered manner along the stacking direction of the cells 21 and the direction orthogonal to the stacking direction, the liquid medium W becomes a turbulent flow and flows through the refrigerant flow path 91, thereby enhancing the efficiency of heat exchange between the liquid medium W and the bottom plate 60, and further improving the cooling performance.

Figure 5:
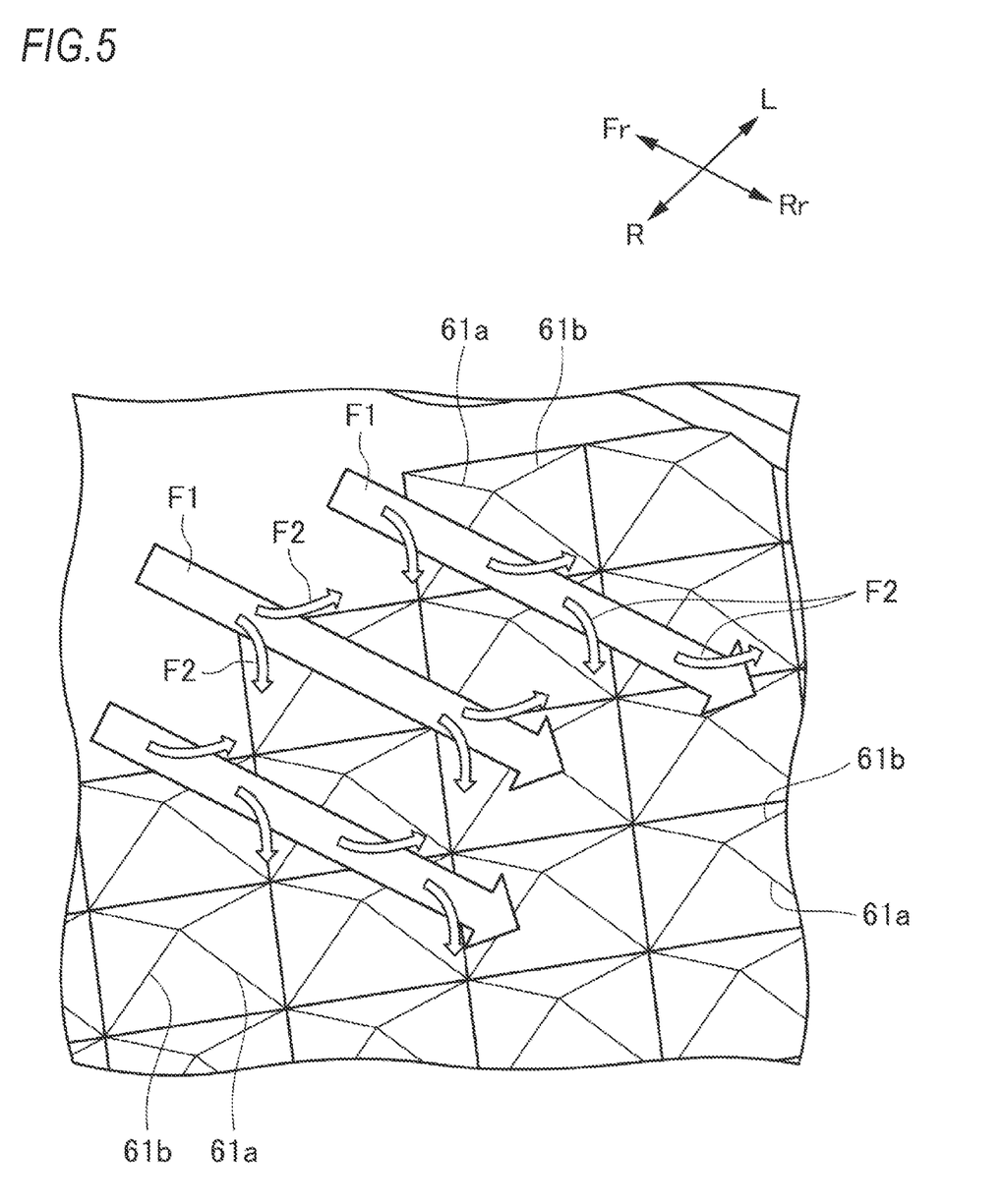
FIG. 5 is an explanatory view showing how a liquid refrigerant flows in the refrigerant flow path shown in FIG. 4.

Since each convex portion 61 is a quadrangular pyramid having a square bottom surface and is arranged such that the diagonal line 61a, which is one of the two diagonal lines 61a and 61b, is in the stacking direction of the cells 21, as shown in FIG. 5, the flow F1 of the refrigerant in the stacking direction of the cells 21 is appropriately blocked, and the flow F2 in the direction intersecting therewith is generated, thereby easily generating turbulent flow and further improving the cooling performance.

Figure 6:
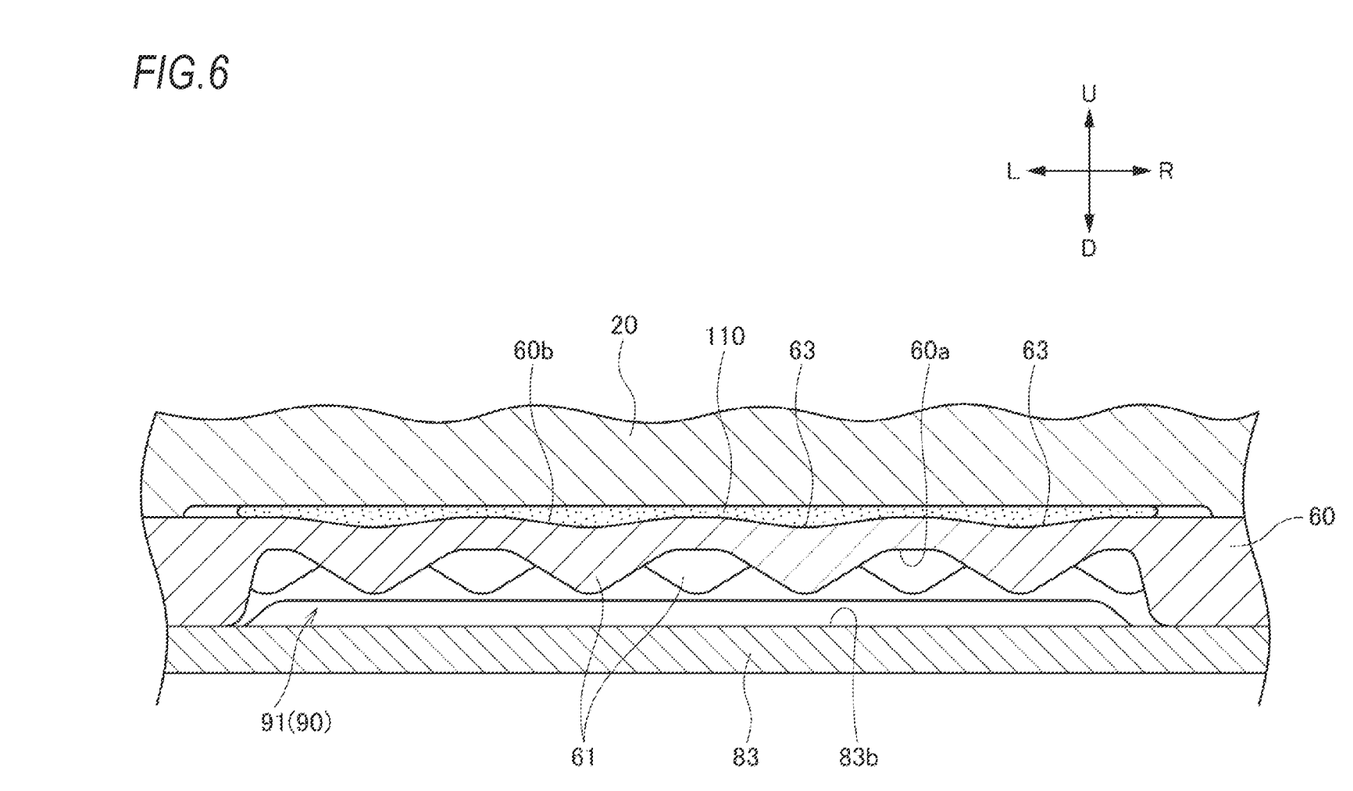
FIG. 6 is a partial enlarged view of FIG. 1.
Figure 7:
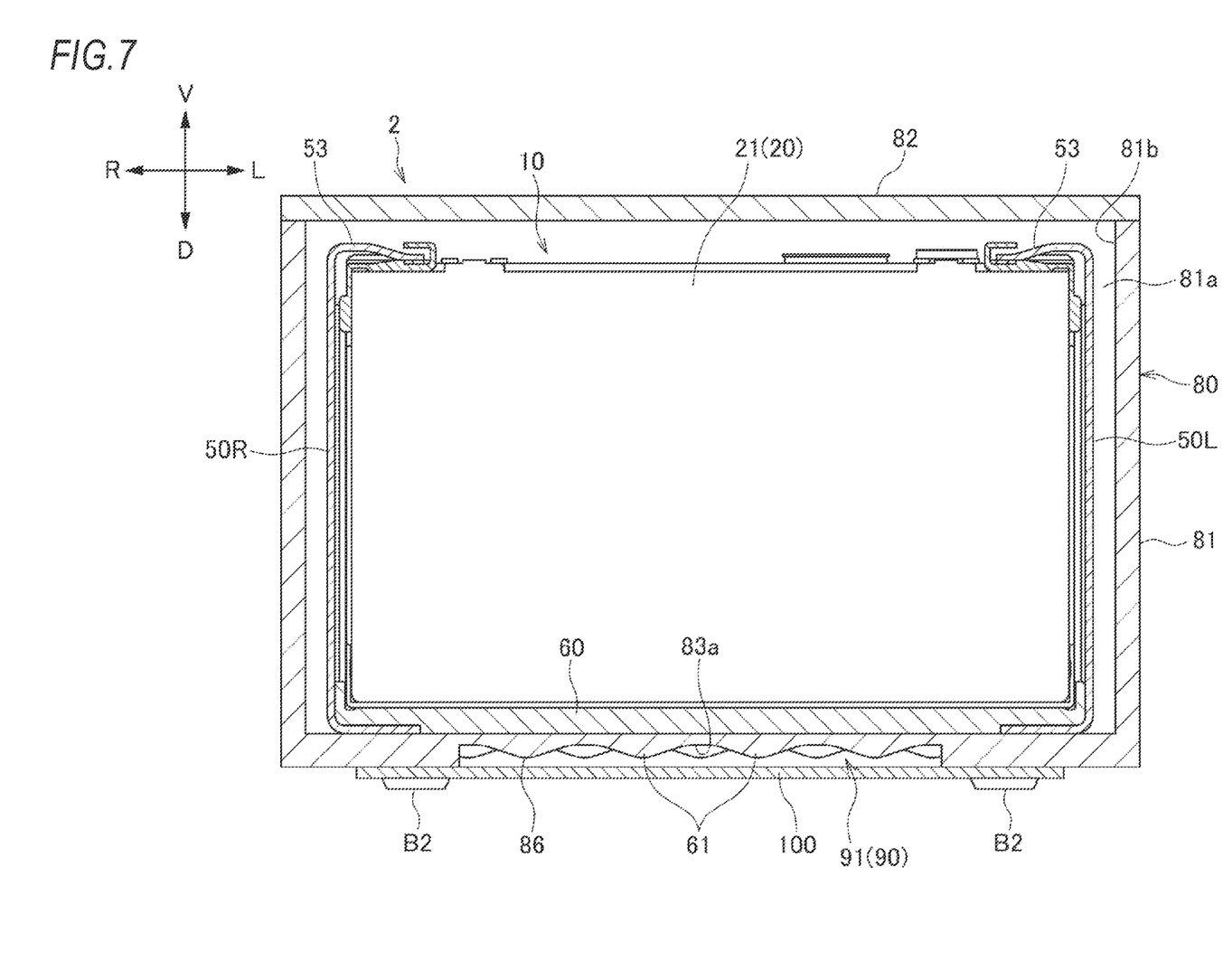
FIG. 7 is a cross-sectional view showing a main part of a battery pack according to a second embodiment.

As shown in FIG. 6, a plurality of concave portions 63 corresponding to the plurality of convex portions 61 are provided on the upper surface 60b of the bottom plate 60, that is, on a facing surface facing the lower surface of the cell stack 20. As described above, in the bottom plate 60 manufactured by aluminum die casting, since the plurality of convex portions 61 are formed on the lower surface 60a and the concave portions 63 corresponding to the plurality of convex portions 61 are formed on the upper surface 60b, the flow of the aluminum fluid during molding of the bottom plate 60 is improved and the moldability is improved.

A heat transfer sheet 110 is provided between the lower surface of the cell stack 20 and the upper surface 60b of the bottom plate 60. An air layer is likely to be formed between the lower surface of the cell stack 20 and the upper surface 60b of the bottom plate 60 where the plurality of concave portions 63 are formed, but the provision of the heat transfer sheet 110 eliminates the air layer, thereby improving thermal conductivity.

Second Embodiment

Hereinafter, the components that are the same as, or functionally common to those of the first embodiment are denoted by the same reference numerals, and the description thereof will be omitted as appropriate.

In the battery pack 2 according to the second embodiment, as shown in FIG. 6, the refrigerant flow path 91 as the cooling mechanism 90 is provided on a lower surface 83a of the base plate 83 of the battery case 80 housing the battery module 10. Specifically, the base plate 83 is provided with a concave portion 86 on the lower surface 83a of the base plate 83, and the concave portion 86 is sealed by a cover member 100, such that the refrigerant flow path 91 is formed by the concave portion 86 of the battery case 80 and the cover member 100. The lower surface 83a of the base plate 83, that is, the refrigerant flow path forming surface is provided with a plurality of convex portions 61 protruding into the refrigerant flow path 91.

As in the first embodiment, the plurality of convex portions 61 are arranged in a staggered manner along the stacking direction (front-and-rear direction) of the cells 21 and the direction orthogonal to the stacking direction (left-and-right direction), and each convex portion 61 is a quadrangular pyramid having a square bottom surface, and is arranged such that the diagonal line 61a, which is one of the two diagonal lines 61a and 61b, is in the stacking direction of the cells 21.

The base plate 83 of the battery case 80 is preferably manufactured by aluminum die casting. Since the base plate 83 is manufactured by aluminum die casting, it is easy to form an uneven shape. The refrigerant flow path 91 may be easily formed by forming a plurality of convex portions 61 in the concave portion 86 and sealing the concave portion 86 with the cover member 100. In the present embodiment, the bottom plate 60 and the base plate 83 of the battery case 80 serve as partition walls separating the cell stack 20 and the refrigerant flow path 91, and the battery module 10 is cooled by the liquid medium W via the bottom plate 60 and the base plate 83.

Although various embodiments have been described above with reference to the drawings, it goes without saying that the present disclosure is not limited to such examples. It will be apparent that those skilled in the art, within the scope described in the claims, can come up with various kinds of modification examples, or modifications, which are naturally within the technical scope of the present disclosure. The components in the embodiment described above may be arbitrarily combined without departing from the spirit of the disclosure.

For example, in the embodiments described above, the plurality of convex portions 61 are arranged in a staggered manner along the stacking direction of the cells 21 and the direction orthogonal to the stacking direction, but it suffices if the plurality of convex portions 61 are arranged in a staggered manner along at least the stacking direction of the cells 21.

While the embodiments described above illustrate each convex portion 61 being a quadrangular pyramid having a square bottom surface, each convex portion 61 may be a quadrangular pyramid having a rectangular bottom surface. The present disclosure is not limited to the quadrangular pyramid, and may be a cone, a triangular pyramid, or a polygonal pyramid of which the bottom surface has five or more sides.

In the above embodiments, each convex portion 61 may be arranged such that the diagonal line 61a, which is one of the two diagonal lines 61a and 61b of, coincides with the stacking direction of the cells 21, but may also be arranged such that the diagonal line 61a intersects the stacking direction of the cells 21.

At least the following matters are described herein. While the corresponding components and the like in the embodiments described above are shown in parenthesis, the present disclosure is not limited thereto.

A battery pack (battery packs 1 and 2) including:
(1) a battery module (battery module 10) including a cell stack (cell stack 20) configured by stacking a plurality of cells (cells 21); and
a cooling mechanism (cooling mechanism 90) for cooling the battery module, in which
the cooling mechanism is a refrigerant flow path (refrigerant flow path 91) through which a liquid medium (liquid medium W) passes,
the cell stack and the refrigerant flow path are arranged swish a partition wall (bottom plate 60, base plate 83) being interposed therebetween,
a refrigerant flow path forming surface (lower surface 60a, lower surface 83a) of the partition wall is provided with a plurality of convex portions (convex portions 61), and
the plurality of convex portions are arranged in a staggered manner along a stacking direction of the cells.

According to (1), since the plurality of convex portions are arranged in a staggered manner along the stacking direction of the cells, the liquid refrigerant becomes a turbulent flow and flows through the refrigerant flow path, thereby enhancing the efficiency of heat exchange occurring between the liquid medium and the battery module through the partition wall, and improving the cooling performance of the battery module.

(2) In the battery pack according to (1),
the plurality of convex portions are arranged in the staggered manner in a direction orthogonal to the stacking direction.

According to (2), since turbulence is more likely to occur, the cooling performance is further improved.

(3) In the battery pack according to (1) or (2),
each of the convex portions is a pyramid.

According to (3), since turbulence is more likely to occur as compared with the case inn which each convex portion is conical, the cooling performance is further improved.

(4) In the battery pack according to (3),
each of the convex portions is a quadrangular pyramid having a square bottom surface, and is arranged such that one of two diagonal lines (diagonal lines 61a and 61b) is in the stacking direction.

According to (4), since the liquid medium is likely to flow in the direction orthogonal to the stacking direction of the cells, turbulent flow is likely to occur.

(5) In the battery pack according to any one of (1) to (4),
a plurality of concave portions corresponding to the plurality of convex portions are provided on a facing surface of the partition wall which faces the cell stack, and
the partition wall is manufactured by aluminum die casting.

According to (5), since the plurality of convex portions are formed on one surface (refrigerant flow path forming surface) of the partition wall manufactured by aluminum die casting, and concave portions are formed on the other surface (facing surface that faces the cell stack), the flow of the aluminum fluid during molding of the partition wall is improved and the moldability is improved.

(6) In the battery pack according to (5),
a heat transfer sheet (heat transfer sheet 110) is provided between the bottom surface of the cell stack and the facing surface.

According to (6), the thermal conductivity between the cell stack and the partition wall is improved.

(7) In the battery pack according to (5) or (6),
the partition wall is a bottom plate (bottom plate 60) of the battery module,
a concave portion is provided on a lower surface (lower surface 60a) of the bottom plate,
the concave portion is sealed with a bottom portion (base plate 83) of a battery case (battery case 80) housing the battery module, and
the refrigerant flow path is formed by the concave portion of the battery case and the bottom portion of the battery case.

According to (7), since a plurality of convex portions provided in the concave portions are formed on the lower surface of the bottom plate and the concave portions are sealed with the bottom portion of the battery case, the refrigerant flow path may be easily formed.

(8) In the battery pack according to (5) or (6),
the partition wall is a bottom portion (base plate 83) of a battery case (battery case 80) housing the battery module,
a lower surface (lower surface 83a) of the bottom portion is provided with a concave portion (concave portion 86),
the concave portion is sealed with a cover member (cover member 100), and
the refrigerant flow path is formed by the concave portion of the battery case and the cover member.

According to (8), a plurality of convex portions are formed in the concave portion provided in the bottom portion of the battery case, and the concave portion is sealed with the cover member, so that the refrigerant flow path may be easily formed.

DESCRIPTION OF REFERENCE NUMERALS AND SIGNS 1, 2 battery pack
10 battery module
21 cells
20 cell stack
60 bottom plate (partition wall)
60a lower surface (refrigerant flow path forming surface)
61 convex portion
61a, 61b diagonal line
80 battery case
83 base plate (bottom portion, partition wall)
83a lower surface (refrigerant flow path forming surface)

86 concave portion
90 cooling mechanism
91 refrigerant flow path
100 cover member
110 heat transfer sheet
W liquid medium

The invention claimed is:

1. A battery pack comprising:
a battery module including a cell stack configured by stacking a plurality of cells; and
a cooling mechanism for cooling the battery module, wherein
the cooling mechanism is a refrigerant flow path through which a liquid medium passes,
the cell stack and the refrigerant flow path are arranged with a partition wall being interposed therebetween,
the partition wall forms a part of the refrigerant flow path and has a surface provided with a plurality of convex portions,
the plurality of convex portions are arranged in a staggered manner along a stacking direction of the cells, and
each of the convex portions is a quadrangular pyramid having a square bottom surface, and is arranged such that one of two diagonal lines is in the stacking direction.

2. The battery pack according to claim 1, wherein the plurality of convex portions are arranged in the staggered manner in a direction orthogonal to the stacking direction.

3. A battery pack according to claim 1, wherein comprising:
a battery module including a cell stack configured by stacking a plurality of cells; and
a cooling mechanism for cooling the battery module, wherein
the cooling mechanism is a refrigerant flow path through which a liquid medium passes,
the cell stack and the refrigerant flow path are arranged with a partition wall being interposed therebetween,
the partition wall forms a part of the refrigerant flow path and has a surface provided with a plurality of convex portions,
the plurality of convex portions are arranged in a staggered manner along a stacking direction of the cells,
a plurality of concave portions corresponding to the plurality of convex portions are provided on a facing surface of the partition wall which faces the cell stack, and
the partition wall is manufactured by aluminum die casting.

4. The battery pack according to claim 3, wherein a heat transfer sheet is provided between a bottom surface of the cell stack and the facing surface.

5. A battery pack comprising:
a battery module including a cell stack configured by stacking a plurality of cells; and
a cooling mechanism for cooling the battery module, wherein
the cooling mechanism is a refrigerant flow path through which a liquid medium passes,
the cell stack and the refrigerant flow path are arranged with a partition wall being interposed therebetween,
the partition wall forms a part of the refrigerant flow path and has a surface provided with a plurality of convex portions,
the plurality of convex portions are arranged in a staggered manner along a stacking direction of the cells,
the partition wall is a bottom plate of the battery module,
a concave portion is provided on a lower surface of the bottom plate,
the concave portion is sealed at a bottom portion of a battery case housing the battery module, and
the refrigerant flow path is formed by the concave portion of the battery case bottom plate and the bottom portion of the battery case.

6. The battery pack according to claim 1, wherein
the partition wall is a bottom portion of a battery case housing the battery module,
a lower surface of the bottom portion is provided with a concave portion,
the concave portion is sealed with a cover member, and
the refrigerant flow path is formed by the concave portion of the battery case and the cover member.

* * * * *